(12) United States Patent
Erdem et al.

(10) Patent No.: US 8,927,646 B2
(45) Date of Patent: *Jan. 6, 2015

(54) POLYURETHANE DISPERSION, METHOD OF PRODUCING THE SAME, COATED ARTICLES, AND METHOD FOR COATING ARTICLES

(75) Inventors: Bedri Erdem, Midland, MI (US); Debkumar Bhattacharjee, Lake Jackson, TX (US); Kumar Nanjundiah, Midland, MI (US); John N. Argyropoulos, Midland, MI (US); Michael C. Kaufman, Apex, NC (US); Jihui Guo, Cary, NC (US); Suresh Subramonian, Cary, NC (US)

(73) Assignee: Dow Global Technologies LLC, Midland, MI (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/262,574

(22) PCT Filed: Mar. 31, 2010

(86) PCT No.: PCT/US2010/029325
§ 371 (c)(1),
(2), (4) Date: Oct. 24, 2011

(87) PCT Pub. No.: WO2010/117838
PCT Pub. Date: Oct. 14, 2010

(65) Prior Publication Data
US 2012/0053292 A1    Mar. 1, 2012

Related U.S. Application Data

(60) Provisional application No. 61/165,013, filed on Mar. 31, 2009.

(51) Int. Cl.
| C08G 18/36 | (2006.01) |
| C09D 175/04 | (2006.01) |
| C08G 18/08 | (2006.01) |
| C08G 18/32 | (2006.01) |

(52) U.S. Cl.
CPC ............ *C08G 18/36* (2013.01); *C08G 18/0823* (2013.01); *C08G 18/0866* (2013.01); *C08G 18/3212* (2013.01); *C08G 18/3228* (2013.01); *C09D 175/04* (2013.01)
USPC ......................... 524/591; 524/590; 428/423.1

(58) Field of Classification Search
USPC .................................................. 524/590, 591
See application file for complete search history.

(56) References Cited

U.S. PATENT DOCUMENTS

| 3,941,733 | A | 3/1976 | Chang |
| 4,496,487 | A | 1/1985 | Peerman et al. |
| 6,359,060 | B1 | 3/2002 | Schafheutle et al. |
| 6,559,225 | B1 | 5/2003 | Irie et al. |
| 2001/0038918 | A1 | 11/2001 | Weikard et al. |
| 2002/0026006 | A1 | 2/2002 | Garcia et al. |
| 2006/0183848 | A1 | 8/2006 | Maier et al. |
| 2008/0096995 | A1 | 4/2008 | Bedri et al. |
| 2008/0171832 | A1 * | 7/2008 | Gertzmann et al. .......... 524/839 |
| 2012/0035318 | A1 * | 2/2012 | Erdem et al. .................. 524/591 |

FOREIGN PATENT DOCUMENTS

| DE | 4020455 | | 1/1992 |
| EP | 647665 | A2 * | 4/1995 |
| EP | 1591502 | A1 | 11/2005 |
| EP | 1849810 | A1 | 10/2007 |
| JP | 2000273138 | | 10/2000 |
| WO | 9413723 | A1 | 6/1994 |
| WO | 2004096882 | A1 | 11/2004 |
| WO | 2004096883 | A1 | 11/2004 |

OTHER PUBLICATIONS

Tokuhiro, Sato, et al., JP2005342907A Abstract, Method for Forming Coating Film of Pencil Barrel and Pencil, Dec. 15, 2005.

* cited by examiner

*Primary Examiner* — Vickey Nerangis

(57) ABSTRACT

The instant invention is a polyurethane dispersion, method of producing the same, coated articles, and method of coating articles. The polyurethane dispersion according to the instant invention comprises (a) one or more polyurethane units derived from one or more prepolymers, wherein the one or more prepolymers comprise the reaction product of one or more natural oil based polyols dissolved in dipropylene glycol dimethyl ether in the presence of one or more first surfactants with one or more isocyanates; and (b) water.

2 Claims, 2 Drawing Sheets

US 8,927,646 B2

POLYURETHANE DISPERSION, METHOD OF PRODUCING THE SAME, COATED ARTICLES, AND METHOD FOR COATING ARTICLES

CROSS-REFERENCE TO RELATED APPLICATIONS

This application is a non-provisional application claiming priority from the U.S. Provisional Patent Application No. 61/165,013, filed on Mar. 31, 2009, entitled "POLYURETHANE DISPERSION, METHOD OF PRODUCING THE SAME, COATED ARTICLES, AND METHOD FOR COATING ARTICLES," the teachings of which are incorporated by reference herein, as if reproduced in full hereinbelow.

FIELD OF INVENTION

The instant invention relates to a polyurethane dispersion, method of producing the same, coated articles, and method for coating articles.

BACKGROUND OF THE INVENTION

Adhesion is an important performance property for surface coating applications, such as wood coating applications, concrete coating applications, metal coating applications, or plastic coating applications. Polyurethane dispersions are commonly used for such coating applications by the original equipment manufactures or subsequent individual end-users. Due to the nature of the wood surface and polyurethane chemistry the adhesion on wood surface is very challenging. Several different approaches have been employed to promote better adhesion on the wood substrates. These approaches include, for example, the incorporation of silane functionality on polyurethane backbone, the incorporation of acrylic/vinyl functionality, e.g. hybrids and blends, fatty acid modification to the backbone, incorporation of ultraviolet curable moieties as well as more exotic chemistries such a fluorination, or chlorination. The use of adhesion promoters as additives to promote adhesion is also common. However, these approaches result in extra cost and effort to achieve the desired performance.

Accordingly, there is need for a polyurethane dispersion that provides improved adhesion properties, for example, in wood coating applications, concrete coating applications, metal coating applications, or plastic coating applications. Additionally, there is a need for a method of producing a polyurethane dispersion that provides improved adhesion properties, for example, in wood coating applications, concrete coating applications, metal coating applications, or plastic coating applications.

SUMMARY OF THE INVENTION

The instant invention is a polyurethane dispersion, method of producing the same, coated articles, and method of coating articles.

In one embodiment, the present invention provides a polyurethane dispersion comprising (a) one or more polyurethane units derived from one or more prepolymers, wherein the one or more prepolymers comprise the reaction product of one or more natural oil based polyols dissolved in dipropylene glycol dimethyl ether in the presence of one or more first surfactants with one or more isocyanates; and (b) water.

In another embodiment, the present invention provides a process for producing a polyurethane dispersion comprising the steps of: (1) providing a first stream comprising one or more prepolymers, wherein the one or more prepolymers comprise the reaction product of one or more natural oil based polyols dissolved in dipropylene glycol dimethyl ether in the presence of one or more surfactants with one or more isocyanates, and wherein the prepolymer is optionally neutralized with one or more neutralizing agents; (2) providing a second stream comprising water; (3) merging the first stream and the second stream together; (4) thereby forming prepolymer dispersion; (5) optionally neutralizing the prepolymer dispersion; (6) chain extending said prepolymers; (7) thereby forming the polyurethane dispersion.

In another embodiment, the present invention provides a coated article comprising a substrate; and a coating associated with one or more surfaces of the substrate, wherein the coating is derived from a polyurethane dispersion comprising: (a) one or more polyurethane units derived from one or more prepolymers, wherein the one or more prepolymers comprise the reaction product of one or more natural oil based polyols dissolved in dipropylene glycol dimethyl ether in the presence of one or more surfactants with one or more isocyanates; and (b) water.

In another embodiment, the present invention provides a method of making a coated article comprising the steps of: (1) selecting a substrate; (2) selecting a coating composition comprising a polyurethane dispersion comprising (a) one or more polyurethane units derived from one or more prepolymers, wherein the one or more prepolymers comprise the reaction product of one or more natural oil based polyols dissolved in dipropylene glycol dimethyl ether in the presence of one or more surfactants with one or more isocyanates; and (b) water; (3) applying the coating composition to one or more surfaces of said substrate; (4) removing at least a portion of the water; (5) thereby forming the coated article.

In an alternative embodiment, the instant invention provides a polyurethane dispersion, method of producing the same, coated articles, and method of coating articles, in accordance with any of the preceding embodiments, except that the one or more prepolymers comprise the reaction product of one or more natural oil based polyols dissolved in dipropylene glycol dimethyl ether and dipropylene glycol dimethyl ether in the presence of one or more surfactants with one or more isocyanates.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
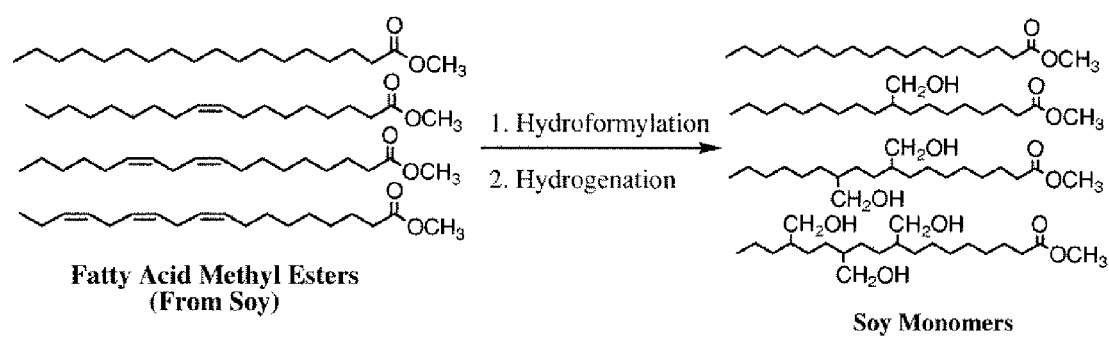
FIG. 1 illustrates a first embodiment of a soy monomer chemistry.

The present invention is a polyurethane dispersion, method of producing the same, coated articles, and method of coating articles. The polyurethane dispersion according to the instant invention comprises (a) one or more polyurethane units derived from one or more prepolymers, wherein the one or more prepolymers comprise the reaction product of one or more natural oil based polyols dissolved in dipropylene glycol dimethyl ether in the presence of one or more first surfactants with one or more isocyanates; and (b) water. The process for producing a polyurethane dispersion according to the present invention comprises the steps of: (1) providing a first stream comprising one or more prepolymers, wherein the one or more prepolymers comprise the reaction product of one or more natural oil based polyols dissolved in dipropylene glycol dimethyl ether in the presence of one or more first surfactants with one or more isocyanates, and wherein the prepolymer is optionally neutralized with one or more neutralizing agents; (2) providing a second stream comprising water; (3) merging the first stream and the second stream together; (4) thereby forming prepolymer dispersion; (5) optionally neutralizing the prepolymer dispersion; (6) chain extending said prepolymers; (7) thereby forming the polyurethane dispersion.

The average particle size diameter of the solid content of the present inventive polyurethane dispersion is in range of from 50 to 1000 nm; for example, the average particle size diameter is in the range of from 50 to 500 nm; or in the alternative, from 50 to 500 nm; or in the alternative, from 50 to 150 nm; or in the alternative, from 60 to 100 nm; or in the alternative, from 60 to 80 nm. The present inventive polyurethane dispersion may have a solid content in the range of from 20 to 60 weight percent, not including the weight of any additional fillers; for example, the solid content is in the range of from 30 to 50 weight percent; or in the alternative, from 20 to 50 weight percent; or in the alternative, from 30 to 40 weight percent. The present inventive polyurethane dispersion has a viscosity in the range of from 100 to 3000 cPs at 25° C.; for example, from 100 to 1000 cPs at 25° C.; or in the alternative from 200 to 900 cPs at 25° C.; or in the alternative from 200 to 600 cPs at 25° C. The present inventive polyurethane dispersion may comprise 0 to 30, or 5 to 25, or 5 to 20, or 0 to 20 percent by weight of one or more solvents.

The polyurethane dispersion according to the instant invention may further comprise one or more fillers, one or more crosslinking agents, one or more defoaming agents, one or more pigments or colorants, one or more rheology modifying agents, one or more adhesion promoting agents, one or more mar and slip agents, one or more wetting agents, one or more anti-freeze agents, one or more biocides or anti-microbial agents; one or more surfactants; one or more UV stabilizing agents; one or more antioxidants; one or more flow control agents, and combinations thereof.

The one or more prepolymers comprise the reaction product of a mixture dissolved in dipropylene glycol dimethyl ether in the presence of one or more first surfactants with one or more isocyanates, wherein the mixture comprises one or more natural oil based polyols, and one or more adipate polyols, and optionally one or more short diols.

Natural Oil Based Polyols

The natural oil based polyols are polyols based on or derived from renewable feedstock resources such as natural and/or genetically modified plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. The natural product may contain at least about 85 percent by weight unsaturated fatty acids. Examples of preferred vegetable oils include, but are not limited to, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used.

Several chemistries can be used to prepare the natural oil based polyols. Such modifications of a renewable resource include, but is not limited to, for example, epoxidation, hydroxylation, ozonolysis, esterification, hydroformylation, or alkoxylation. Such modifications are commonly known in the art.

After the production of such polyols by modification of the natural oils, the modified products may be further alkoxylated. The use of ethylene oxide (EO) or mixtures of EO with other oxides, introduces hydrophilic moieties into the polyol. In one embodiment, the modified product undergoes alkoxylation with sufficient EO to produce a natural oil based polyol with between 10 weight percent and 60 weight percent EO, for example, between 20 weight percent and about 40 weight percent EO.

In another embodiment, the natural oil based polyols are obtained by a multi-step process wherein the animal or vegetable oils/fats are subjected to transesterification and the constituent fatty acids recovered. This step is followed by hydroformylating carbon-carbon double bonds in the constituent fatty acids to form hydroxymethyl groups, and then forming a polyester or polyether/polyester by reaction of the hydroxymethylated fatty acid with an appropriate initiator compound. Such a multi-step process is commonly known in the art, and is described, for example, in PCT publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil based polyols may be any initiator used in the production of conventional petroleum-based polyols. The initiator may, for example, be selected from the group consisting of neopentylglycol; 1,2-propylene glycol; trimethylolpropane; pentaerythritol; sorbitol; sucrose; glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In the alternative, the initiator may be selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. In another alternative, the initiator is glycerol, trimethylopropane, pentaerythritol, sucrose, sorbitol, and/or mixture thereof.

In one embodiment, the initiators are alkoxlyated with ethylene oxide or a mixture of ethylene oxide and at least one other alkylene oxide to give an alkoxylated initiator with a molecular weight between about 200 and about 6000, preferably between about 500 and about 3000.

The functionality of the at least one natural oil based polyol, is above about 1.5 and generally not higher than about 6. In one embodiment, the functionality is below about 4. In one embodiment the functionality is in the range of from 1.5 to 3. The hydroxyl number of the at least one natural oil based polyol is below about 150 mg KOH/g, preferably between about 50 and about 120, more preferably between about 60 and about 120. In one embodiment, the hydroxyl number is below about 100.

The level of renewable feedstock in the natural oil based polyol can vary between about 10 and about 100 percent, usually between about 10 and about 90 percent.

The natural oil based polyols may constitute up to about 90 weight percent of a polyol blend. However, in one embodiment, the natural oil based polyol may constitute at least 5 weight percent, at least 10 weight percent, at least 25 weight percent, at least 35 weight percent, at least 40 weight percent, at least 50 weight percent, or at least 55 weight percent of the total weight of the polyol blend. The natural oil based polyols may constitute 40 percent or more, 50 weight percent or more, 60 weight percent or more, 75 weight percent or more, 85 weight percent or more, 90 weight percent or more, or 95 weight percent or more of the total weight of the combined polyols. Combination of two types or more of natural oil based polyols may also be used.

The viscosity measured at 25° C. of the natural oil based polyols is generally less than about 6,000 mPa·s; for example, the viscosity measured at 25° C. of the natural oil based polyols is less than about 5,000 mPa·s. The natural oil based polyol may have a molecular weight in the range of from 500 to 3000 daltons; for example, from 800 to 1500 daltons.

NOP may be a blend with any of the following:
aliphatic and aromatic polyester polyols including caprolactone based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyols.

Isocyanate:
Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3 and 1,4-bis (isocyanatemethyl)isocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations thereof.

First Surfactant
The first surfactant may comprise less than 6 percent by weight; for example, the first surfactant may comprise 4 to 6 weight percent. Exemplary first surfactants include, but are not limited to, dimethylol propionic acid, dimethylol propionic acid, dimethylol botanic acid, and diaminosulfonate.

Solvent
The solvent may be any solvent; for example, the solvent may be an organic solvent. Exemplary solvents include, but are not limited to dipropylene glycol dimethyl ether, which is commercially available from The Dow Chemical Company under the tradename PROGLYDE® DMM, and tripropylene glycol dimethyl ether. Additional solvents may include acetone, methyl ethyl ketone, toluene, Tetrahydrofuran (THF).

Additional solvents include, but are not limited to, proplylene glycol methyl ether acetate, diproplyene glycol methyl ether acetate, propylene glycole diacetate, dipropylene glycol dimethyl ether, diethylene glycol n-butyl ether acetate, ethylene glycol n-butyl ether acetate.

Prepolymer:
The one or more prepolymers comprise the reaction product of one or more natural oil based polyols dissolved in dipropylene glycol dimethyl ether in the presence of one or more first surfactants with one or more isocyanates. The polyurethane prepolymer used in the present invention may be produced by any conventionally known processes, for example, solution process, hot melt process, or polyurethane prepolymer mixing process, for example, in batch or continuous process. Furthermore, the polyurethane prepolymer may, for example, be produced via a process for reacting a polyisocyanate compound with an active hydrogen-containing compound, i.e. one or more natural oil based polyols, and examples thereof include a process for reacting a polyisocyanate compound with one or more natural oil based polyols in an organic solvent, followed optionally by removal of the solvent. In one embodiment, the one or more prepolymers comprise the reaction product of one or more natural oil based polyols dissolved in dipropylene glycol dimethyl ether in the presence of one or more first surfactants with one or more isocyanates. In one embodiment, the prepolymer is free of N-methyl Pyrrolidone (NMP).

For example, the polyisocyanate compound may be reacted with one or more natural oil based polyols dissolved in an organic solvent at a temperature in the range of about 20° C. to about 150° C.; or in the alternative, in the range of 30° C. to 130° C., at an equivalent ratio of an isocyanate group to an active hydrogen group of, for example, from 1.1:1 to 3:1, or in the alternative, from 1.2:1 to 2:1. In the alternative, the prepolymer may be prepared with an excess amount of active hydrogen group thereby facilitating the production of hydroxyl terminal polymers.

The polyurethane prepolymer derived from one or more natural oil based polyols in an organic solvent could be prepared in the presence of one or more reactive or un-reactive ethylenically unsaturated monomers. Such monomers may further be polymerized to produce hybrid polyurethane dispersions.

The polyurethane prepolymer may further include one or more ionic groups. Functional moieties used in the preparation of such prepolymers with ionic group include sulfonic acid diol, e.g. 3-(2,3-dihydroxypropxy)-1-propane-sulfonic acid; sulfopolycarboxylic acid, e.g. sulfoisophthalic acid, sulfosuccinic acid; and aminosulfonic acid, e.g. 2-aminoethanesulfonic acid and 3-amino propranesulfonic acid; sulfamic acid diol, e.g. N,N-bis(2-hydroxyalkyl)sulfamic acid (C1 to C6 of alkyl group), or its alkylene oxide (AO) adduct such as ethylene oxide and propylene oxide, N,N-bis(2-hydroxy-ethyl)sulfamic acid; bis(2-hydroxyethyl)phosphate; dialkylol alkanoic acid C6 to C24, e.g. 2,2-dimethylol propionic acid, 2,2-dimethylol butanoic acid, 2,2-dimethylol heptanoic acid, 2,2-dimethylol octanic acid; and amino acid, e.g. 2-aminoethanoic acid; and salts thereof, for example, salts of amines such as triethylamine, alkanolamine, morpholine, and/or alkali metal salts such as sodium salt. Examples containing cationic group include, but are not limited to, quaternary ammonium base-containing diol, tertiary ammonium group-containing diol and salts thereof.

The polyurethane prepolymer may further include a hydrophilic group. The term "hydrophilic group," as used herein, refers to an anionic group (for example, carboxyl group, sulfonic acid group, or phosphoric acid group), or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

Among hydrophilic groups, a nonionic hydrophilic group having a repeating unit of ethylene oxide may, for example, be preferred because the finally obtained polyurethane emulsion has excellent compatibility with other kinds of emulsions. Introduction of a carboxyl group and/or a sulfonic acid group is effective to make the particle size finer.

When the ionic group is an anionic group, the neutralizer used for neutralization includes, for example, nonvolatile bases such as sodium hydroxide and potassium hydroxide; and volatile bases such as tertiary amines (e.g. trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the polyurethane prepolymer having an ionic group. The neutralization may be affected by adding the neutralizing agent directly the polyurethane prepolymer or by adding to the aqueous phase of during the production of polyurethane dispersion.

Polyurethane prepolymers may further be chain extended via a chain extender. Any chain extender known to be useful to those of ordinary skill in the art of preparing polyurethanes can be used with the present invention. Such chain extenders typically have a molecular weight of about 30 to about 500 and have at least two active hydrogen containing groups. Polyamines are a preferred class of chain extenders. Other materials, particularly water, can function to extend chain length and so are chain extenders for purposes of the present invention. It is particularly preferred that the chain extender is water or a mixture of water and an amine such as, for example, aminated polypropylene glycols such as Jeffamine D-400 from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender may be used as a solution of chain extender in water.

Polyurethane Dispersion (PUD) Preparation

PUDs according to the present invention may be produced via batch process or continuous process. Polyurethane prepolymer, optionally one or more surfactants, and water are fed into a mixer, e.g. an OAKS Mixer or an IKA Mixer, thereby dispersing the polyurethane prepolymer into the water, and then it is chain extended with a primary or secondary amine to form the PUD. In one embodiment, the PUD is free of N-methyl Pyrrolidone (NMP).

In one embodiment, the process for producing a polyurethane dispersion according to the present invention comprises the steps of: (1) providing a first stream comprising one or more prepolymers, wherein the one or more prepolymers comprise the reaction product of one or more natural oil based polyols dissolved in dipropylene glycol dimethyl ether in the presence of one or more first surfactants with one or more isocyanates, and wherein the prepolymer is optionally neutralized with one or more neutralizing agents; (2) providing a second stream comprising water; (3) merging the first stream and the second stream together; (4) thereby forming prepolymer dispersion; (5) optionally neutralizing the prepolymer dispersion; (6) chain extending said prepolymers; (7) thereby forming the polyurethane dispersion.

End-Use Applications

The coated articles according to the present invention comprise a substrate; and a coating associated with one or more surfaces of the substrate, wherein the coating is derived from the inventive polyurethane dispersion, as described hereinabove. The one or more surfaces of the substrate may be treated, e.g. primed, prior to the application of the inventive polyurethane dispersion of the present invention. The substrate may be any substrate; for example, the substrate may comprise wood, concrete, plastic, metal, and combinations thereof.

In one embodiment, a coated article comprises a substrate; and a coating associated with one or more surfaces of the substrate, wherein the coating is derived from a polyurethane dispersion comprising: (a) one or more polyurethane units derived from one or more prepolymers, wherein the one or more prepolymers comprise the reaction product of one or more natural oil based polyols dissolved in dipropylene glycol dimethyl ether in the presence of one or more surfactants with one or more isocyanates; and (b) water.

In another embodiment, the method of making a coated article comprises the steps of: (1) selecting a substrate; (2) selecting a coating composition comprising a polyurethane dispersion comprising (a) one or more polyurethane units derived from one or more prepolymers, wherein the one or more prepolymers comprise the reaction product of one or more natural oil based polyols dissolved in dipropylene glycol dimethyl ether in the presence of one or more surfactants with one or more isocyanates; and (b) water; (3) applying the coating composition to one or more surfaces of said substrate; (4) removing at least a portion of the water; (5) thereby forming the coated article.

The inventive polyurethane dispersion may be applied to one or more surfaces of a substrate via any method; for example, via spraying, brushing, dipping, drawdowns and the like.

The polyurethane dispersion of the present invention are film forming compositions. Films derived from the inventive polyurethane dispersion may have a thickness in the range of from 1 µm to 2 mm; or in the alternative, 1 to 500 µm; or in the alternative, 1 to 200 µm; or in the alternative, 1 to 100 µm; or in the alternative, 20 µm to 50 µm. The film derived from the inventive polyurethane dispersion may have an adhesion in the range of greater than 30 percent remaining; in the alternative, greater than 40 percent remaining; in the alternative, greater than 50 percent remaining; in the alternative, greater than 60 percent remaining, measured according to the ASTM D-3359. The inventive polyurethane dispersion may have a rate of hardness development in the range of greater than or equal to 0.002 MPa/min; or in the alternative, in the range of greater than or equal to 0.003 MPa/min; or in the alternative, in the range of greater than or equal to 0.004 MPa/min; or in the alternative, in the range of greater than or equal to 0.005 MPa/min.

Additional solvents may be added to the polyurethane dispersion of the present invention after such dispersions have been prepared. Such solvent include, but are not limited to, Propylene glycol methyl ether, Dipropylene glycol methyl ether, Tri-propylene glycol methyl ether, Propylene glycol n-propyl ether, Dipropylene glycol n-propyl ether, Tri-propylene glycol n-propyl ether, Propylene glycol n-phenyl ether, Diethylene glycol ethyl ether, Diethylene glycol methyl ether, Diethylene glycol n-butyl ether, Diethylene glycol hexyl ether, Ethylene glycol propyl ether, Ethylene glycol n-butyl ether, Ethylene glycol hexyl ether, Triethylene glycol methyl ether, Triethylene glycol ethyl ether, Triethylene glycol propyl ether, Ethylene glycol n-butyl ether, Ethylene glycol phenyl ether, Ethylene glycole n-butyl ether mixture, and mixtures of these solvents.

End-use applications include, but are not limited to, industrial and architectural coatings on any substrate; for example, wood, concrete, plastic, metal, and combinations thereof. Such end-use applications include, but are not limited to, furniture, flooring, kitchen cabinets, and the like.

EXAMPLES

The following examples illustrate the present invention but are not intended to limit the scope of the invention.
Synthesis of NOP Polyols The natural oil polyols (NOPs) were prepared in three reaction steps from the fatty acid methyl esters (FAMES) derived from soy oil. The FAMES are first hydroformylated to the aldehyde intermediates and then hydrogenated in the second step to the soy monomers as shown in FIG. 1. The average hydroxyl functionality of the soy monomers is approximately 1.0.

The resulting monomers are then transesterified with a suitable glycol. In this process, polyol molecular weight advances both by condensation of the monomers with the glycol initiator and self condensation of the monomers. By controlling average functionality of the monomers and their ratio to the glycol initiator, both polyol molecular weight and average functionality can be systematically controlled. Furthermore, the structure of the initiator can be adjusted to achieve desired performance characteristics or compatibility. Preferred glycol initiators contain reactive primary hydroxyl groups, such as 1,6-hexanediol and UNOXOL™ Diol. UNOXOL™ Diol is a liquid cycloaliphatic diol that is an approximately 50:50 mixture of 1,3-cyclohexanedimethanol and 1,4-cyclohexanedimethanol, which is a mixture cis and trans isomers.

Prepolymer Preparation Procedure

Preparation of prepolymers was carried out in a 500-mL, 4-neck round-bottom flask equipped with an addition device, water-cooled condenser, mechanical stirrer, thermometer, and nitrogen inlet/outlet tubes. Nitrogen purge and an agitation rate of 500 rpm were applied throughout the course of the reaction. An oil bath was used as the heating source to maintain reaction temperature. In a typical prepolymer preparation, polyester polyols and dimethylolpropionic acid [DMPA] were added into the reaction flask, followed by the addition of isocyanate. The polyols, which were added either individually or as a blend, were initially heated to a temperature of 15-20° C. below the desired reaction temperature. Upon completion of the polyol and solvent additions, the reaction mixture was heated to the desired temperature (80-90° C.) with agitation (200 rpm). Once the theoretical % NCO is reached, the final product was transferred to sample containers with a nitrogen blanket and used for dispersion. Suitable solvents for the prepolymer include acetone, methyl ethyl ketone and the dimethyl ether of dipropylene glycol.

Polyurethane Dispersion (PUD) Synthesis

PUDs were prepared in a small scale (500 ml) batch process where the prepolymer was neutralized using a tertiary amine (e.g., triethyl amine, TEA) at 95-110% stoichiometric amount (moles) of the acid used in the prepolymer. Predetermined amount of the water was slowly added to the prepolymer as it was vigorously mixed using a special mixer generating high shear. (50,000-100,000 sec$^{-1}$). The water was continuously added as the dispersion viscosity dropped below ~3000 cP (Brookfield Spindle #4, 50 rpm). The dispersion was then fully chain extended with an amine (e.g., ethylene diamine). The final dispersions had a solids content ~35 wt % and number average particle size ~100 nm.

Inventive Example 1

NOP in PROGLYDE® DMM solvent. The ingredients of the formulation, as shown in Table 1, was used to prepare PUD of inventive example 1 containing 100 gm of prepolymer.

TABLE 1

Recipe for the synthesis of PUD

| | Weight (gms) | Description |
|---|---|---|
| 1 | 46 | Soy polyol |
| 2 | 6 | UNOXOL ® diol |
| 3 | 5 | DMPA |
| 4 | 43 | Isophonone di isocyanate |
| 5 | 2.96 | Tri ethyl amine |
| 6 | 3.32 | Ethylene di amine |
| 7 | 25 | PROGLYDE ® DMM solvent |

The procedures described in the previous sections were followed with the above recipe to get the desired PUD. The PUDs were characterized for the percentage solids and particle size before coating them on different substrates. The coatings were prepared on pre-sealed oak wood substrates using a paint brush. The samples were dried for 7 days under ambient conditions (50% RH and 23° C.) before testing for properties.

Comparative Example 2

Preparation

The recipe used in example 1 was modified by replacing the PROGLYDE® DMM with N-methylpyrrolidone [NMP], as the solvent.

Comparative Example 3

Preparation

The recipe used in example 1 was modified by replacing the NOP polyol with a Caprolactone diol of similar molecular weight and functionality. PROGLYDE® DMM was used as the solvent.

Comparative Example 4

Preparation

The recipe used in example 1 was modified by replacing the NOP polyol with a FomRez PES-G24-112 polyol, provided by Chemtrua, of similar molecular weight and functionality. PROGLYDE® DMM was used as the solvent.

Coating Sample Preparation

The coatings were prepared on pre-sealed oak wood substrates using a paint brush. The samples were dried for 7 days under ambient conditions (50% RH and 23° C.) before testing for properties.

The adhesion measurements were done according to ASTM D-3359. The coatings were made on Oak wood and dried under ambient conditions for 7 days before testing. The cross-hatch tool was used to make a grid of scratches leaving 100 squares of 1 mm side dimension to test adhesion. Scotch tape from 3M having peel strength of 60 N/m² was used to test adhesion. A piece of tape was cut and placed on top of the cross-hatch and pressed with the eraser to get uniform contact. The tape was pulled at 180 degree within 90 seconds of sticking the tape. The number of squares where coating was damaged or removed was noted and the % remaining was used the parameter to measure adhesion. Table 2 summarizes the results.

TABLE 2

Adhesion results for PUD coatings on wood following ASTM D3359 and rate of hardness development determined using DMA

| Sample | Adhesion (% remaining) | | Rate of hardness development* (MPa/min) |
|---|---|---|---|
| | Without crosslinker | With crosslinker | |
| Commercial products | | | |
| A - Alberdingk U915 available from Alberdingk-Boley | 5 | 0 | — |
| B - Bayhydrol XP2557, available from Bayer Material Science | 12 | 30 | 0.0011 |
| Prepared products | | | |
| Inventive Example 1 | 100 | 100 | 0.005 |
| Comparative Example 2 | 12 | 5 | 0.0017 |
| Comparative Example 3 | 0 | — | — |
| Comparative Example 4 | 0 | — | 0.0002 |
| Inventive Example 1 after soaking in water for 5 days and drying | 95 | — | — |

*This rate calculated after subtracting 4 hours for water to evaporate. The results are based on the test method described and cannot be extrapolated to open air drying.

Figure 2:
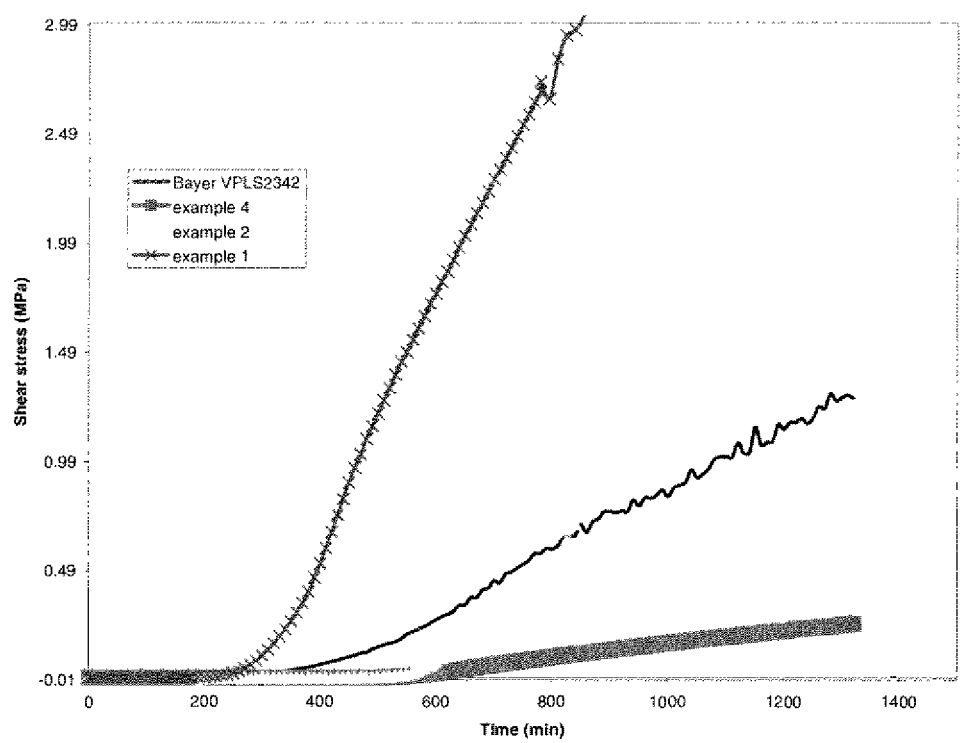
FIG. 2 is a graph illustrating shear stress as a function of time monitoring the early hardness development.

Early Hardness Development:

The hardness development was monitored by measuring the modulus over time using dynamic mechanical spectroscopy. The measurements were made in shear mode using modified parallel plate geometry. The aqueous PUD was placed in an aluminum cup with 25 mm diameter and squeezed to a film of thickness of 1 mm by a plate attached to measuring load cell. The oscillatory shear measurement was carried out at 1 Hz with varying % strain based on the extent of cure. The tests were done at 23° C. and 50% RH. Data points were collected every 10 minutes over a period of 24 hours. The hardness development was faster when using the combination of Soy polyols and PROGLYDE® DMM solvent compared to competitor PUDs as well as PUDs made with adipate polyols. The results are shown in the FIG. 2. The y-axis represents shear stress measured every 10 minutes with a frequency of 1 Hz and strain rate in the linear region. The variation in the onset can be attributed to the amount of water in the PUD. The rate or slope of the lines gives the hardness development rate and it can be clearly seen that Soy PUD with PROGLYDE DMM shows a fast rate of early hardness development.

Additional Examples

Sample A

A mixture comprising 48.5 g (800 MW, 0.12 equiv) natural oil polyester polyol (NOP), 4 g (144 MW, 0.06 equiv) UNOXOL diol, a 50/50 mixture of 1,3 cyclohexane dimethanol and 1,4 cyclohexane-dimethanol isomers, 5 g (134 MW, 0.07 equiv) dimethylolpropionic acid (DMPA), 25 g PROGLYDE® DMM solvent (dipropylene glycol dimethyl ether), 0.01 g dibutyltin dilaurate (DBDTL) catalyst were added to a jacketed reaction vessel equipped with stirrer, heater, thermocouple and condenser and heated to 80° C. with stiffing under a nitrogen head. 42.5 g (222 MW, 0.38 equiv) of isophorone diisocyanate (IPDI) was added to the reaction mixture (initial isocyanate to hydroxyl content: 1.5 equiv/equiv) and held at 80° C. for 4 hrs to form the urethane prepolymer with NCO content of 5.5 wt %. The reaction mixture was cooled to 60° C. and 3.8 g (101 MW, 0.04 equiv) of triethylamine (TEA) was added with stirring to neutralize the COOH groups (0.04 equiv) of DMPA (carboxyl to amine content: 1 equiv/equiv). 140 g of water was added with mixing to form a dispersion of the anionically stabilized prepolymer in water. 41 g of a chilled 10% solution of ethylene diamine (EDA, 60 MW, 0.14 equiv) in water was added with stiffing for the chain extension step to form urea linkages with the residual NCO groups (isocyanate to amine content: 0.96 equiv/equiv). The polyurethane dispersion (PUD) was cooled to room temperature and the following properties were determined:

appearance: translucent dispersion, dries to clear film
pH: 8-10
density: 1.1 g/cc at 25° C.
viscosity: 500 cP at 25° C.
average particle size: 120 nm
solids: 34% by weight
minimum film forming temperature: <0° C.

Sample B

Sample B was prepared using the same formulation and procedure as sample A with the only change being that the neutralization (with TEA), chain extension (with EDA) and dispersion steps were conducted in a rotor stator mechanical disperser rather that in a batch mixer. The properties of sample B are essentially similar to sample A.

Sample C

Sample C was prepared using the same procedure as sample A with the following change in polyol composition. 48.5 g (800 MW, 0.12 equiv) natural oil polyester polyol and 4 g (144 MW, 0.06 equiv) UNOXOL diol are replaced by 22 g (0.06 equiv) natural oil polyester polyol, 6 g (0.08 equiv) UNOXOL diol and 22 g UNOXOL adipate (884 MW, 0.05 equiv). The NCO/OH ratio prior to reaction is unchanged at 1.5. The PUD physical properties of sample C are essentially similar to sample A. The films from sample C are harder and have better abrasion resistance compared to films from sample A because of the higher level of short chain diol and a higher Tg polyester polyol that contribute to hard segment content of the polymer.

Sample D

Sample D was prepared using the same formulation and procedure as sample A with the following change in solvent type: 25 g of n-methylpyrrolidone replaced 25 g PROGLYDE DMM. The properties of sample D are essentially similar to sample A.

Sample E

Sample E is a commercial high solids aliphatic PUD from Essential Industries (R-4188) containing 9% NMP solvent for use as a sealer or topcoat for masonry type substrates. The PUD properties are
appearance: translucent
pH: 7.6
solids: 38% by wt
viscosity: 50 cP at 25° C.
density: 1.05 g/cc at 25° C.

Sample F

Sample F is a commercial solvent free aliphatic urethane acrylic hybrid from Essential Industries (R-4388) for concrete topcoat applications. The properties are:
appearance: translucent
pH: 7.7
solids: 41% by wt
viscosity: <300 cP at 25° C.
density: 1.05 g/cc at 25° C.

PUD Film Performance Testing:

The film performance tests were conducted by diluting all PUD samples to 30% by wt solids to achieve the same film build. Samples A, B, C, D all formed good uniform defect free films without the need for co-solvent whereas sample E (9% NMP) & sample F (0% NMP) required 5% additional NMP to form good quality, defect free film Adhesion Test The adhesion test was conducted per ASTM D 3359. This test assesses the adhesion of coating films to neat and primed substrates by making lattice pattern cuts comprising ⅛" cross hatch scribes in the film, applying a pressure sensitive tape over the scribed area. The pressure sensitive tape is peeled off and the amount of coating lifted or removed is determined by counting the cross hatch squares remaining. In multicoat systems it is important to determine whether the adhesion failure is between coats or between the coating and substrate. A coating with good adhesion to the primer or substrate exhibits a value on the tape pull test for the % coating remaining of >80%, preferably a value of >90% and still more preferably >95%.

Concrete Test Blocks

Concrete test blocks made per ASTM specifications (Patio Concrete Products Inc.) were coated with an acrylic epoxy emulsion (Quikrete 02-51730 garage floor sealer) and allowed to air dry at room temperature for a week. The primed concrete blocks were then coated with samples A through F. The experimental test results for the various samples are presented in Table 1A and show that the NOP PUD samples A and B of the invention containing PROGLYDE DMM solvent show very good adhesion, both neat and with a low level of external crosslinker (aziridine). By contrast, the NOP PUD comparative sample D made with the same formulation and containing NMP shows very poor, unacceptable adhesion, both neat and with a low level of external crosslinker (aziridine). This comparative sample would require an adhesion promoter in the formulation or a tie layer during application to overcome this deficiency;

the NOP PUD sample C of the invention containing PROGLYDE DMM solvent shows very good adhesion compared to the NOP PUD comparative sample D made with the same level of NMP solvent, both neat and with a low level of external crosslinker (aziridine). The formulations are comparable except for the levels of the polyester polyols (NOP, UNOXOL adipate) and short chain diol (UNOXOL);

the commercial PUD and WB urethane acrylic control samples E and F made with 9% and 0% NMP and formulated with 5% additional NMP solvent for good film formation show very poor, unacceptable adhesion in the neat form. Additionally, sample F tested with a low level of external crosslinker (aziridine) shows very poor unacceptable adhesion. These control samples would require an adhesion promoter in the formulation or a tie layer during application to overcome the adhesion deficiency.

TABLE 1A

| PUD | adhesion test | A | B | C | D | E | F |
|---|---|---|---|---|---|---|---|
| Neat PUD | % coating remaining after tape pull | 100 | 83 | 86 | 0 | 0 | 0 |
| PUD + 3% aziridine XAMA-7 crosslinker | % coating remaining after tape pull | 96 | 100 | 100 | 15 | 89 | 0 |

Dirt Pick-Up Resistance Test

The dirt pick-up resistance was measured by the China National Standard Method. The coating is applied on a white plastic panel, dried for 7 days at room temperature and the initial Y reflectance is determined at 3 locations using a BYK Gardner Colorimeter Model 6805. Coal ash, used as representative dirt medium, is mixed with water (1:1) and 0.7 g is applied evenly as a paste with a soft brush onto the white coated plastic panel and dried for 2 hr at 23° C., 50% RH. The panel is placed on a sample rack of a water flushing apparatus and rinsed with a sprinkler connected to a water faucet for 1 min, simulating a rain shower. The panel is moved to ensure that all locations have been rinsed with the running water. The panel is dried at 23° C. 50% RH for 24 hr and the above cycle is repeated for a total of 5 cycles. The final Y reflectance of the panel is determined at the same locations and the average change in reflectance ($\Delta Y$) is calculated Change in $Y$ reflectance=$\Delta Y$=100*(initial $Y$ reflectance−final $Y$ reflectance)/initial $Y$ reflectance A coating with good dirt pickup resistance exhibits a change in reflectance value ($\Delta Y$) after 5 cycles of coal ash exposure and cleaning of 15 or lower, preferably 10 or lower and still more preferably 5 or lower.

The actual experimental test results for the samples are presented in Table 2A and show that:

The NOP PUD samples of the invention (samples A, B & C) made with PROGLYDE DMM solvent exhibit very low $\Delta Y$ values on the DPR test when tested neat and exhibit low $\Delta Y$ values when tested with aziridine crosslinker. Visually, the change in whiteness of the coated sample after 5 cycles of DPR testing is minimal;

The comparative NOP PUD samples made with NMP solvent (sample D) at the same level as samples A, B & C and with the same formulation as samples A & B shows low $\Delta Y$ value when tested neat but a high $\Delta Y$ value when tested with aziridine crosslinker. For the latter sample, the change in whiteness of the coated sample after 5 cycles of DPR testing is clearly noticeable due to the black residue on the coating;

The commercial control samples E & F made with 9 and 0% NMP solvent and formulated with additional 5% NMP solvent for a defect free film show high ΔY values when tested neat and even higher ΔY values when tested with aziridine crosslinker. For both samples and in both cases, the change in whiteness of the coated sample after 5 cycles of DPR testing is very significant due to the black residue retained on the coating;

The commercial control samples E & F made with 9 and 0% NMP solvent and formulated with additional 5% NMP solvent for a defect free film show high ΔY values when tested neat and even higher ΔY values when tested with aziridine crosslinker. For both samples and in both cases, the change in whiteness of the coated sample after 5 cycles of DPR testing is very significant due to the black residue retained on the coating;

TABLE 2A

|  | A | B | C | D | E | F |
|---|---|---|---|---|---|---|
| Neat PUD sample |  |  |  |  |  |  |
| Reflectance L initial | 87.57 | 87.5 | 88.4 | 87.99 | 87.13 | 90.88 |
| Reflectance L final | 77.95 | 78.87 | 82.05 | 77.97 | 62.05 | 75.53 |
| Change in Reflectance ΔL | 9.62 | 8.63 | 6.35 | 10.02 | 25.08 | 15.35 |
| PUD + 3% aziridine XAMA-7 crosslinker sample |  |  |  |  |  |  |
| Reflectance L initial | 89.76 | 89.48 | 89.5 | 90.09 | 90.68 | 90.89 |
| Reflectance L final | 77.33 | 78.37 | 79.09 | 71.81 | 65.64 | 70.86 |
| Change in Reflectance ΔL | 12.43 | 11.11 | 10.41 | 18.28 | 25.04 | 20.03 |

It is important to validate that the change in solvent type from NMP to PROGLYDE® DMM does not has any negative impact on PUD coating properties contributed by the natural oil polyol, such as hydrophobicity. The water resistance test was run per ASTM D 870, by placing a water droplet (covered with a watch glass to prevent evaporation) on a coated sample for a fixed time period, drying the water droplet from the surface and examining the coating for any defects such as whitening, blushing, swelling, blistering or delaminating. The coating is dried at room temperature for 7 days prior to the test and subject to water contact for 2 hrs. The test results for the four NOP PUD samples, shown in Table 3A, indicate that water had a very minor effect on the coatings. The results confirm that the contribution of the natural oil polyol to coating performance attributes such as water resistance are preserved in the PUD coating and is independent of solvent selection.

TABLE 3A

| PUD | Water resistance test (7 day dry film) | A | B | C | D |
|---|---|---|---|---|---|
| Neat PUD | Effect of 2 hr water drop exposure on film | Very slight swell | Very slight swell | Very slight swell | Very slight swell |
| PUD + 3% aziridine XAMA-7 crosslinker | Effect of 2 hr water drop exposure on film | Very slight swell | Very very slight swell | Very very slight swell | Very very slight swell |

The use of a lower boiling point solvent such as PROGLYDE® DMM (evaporation rate: 0.13 vs. nBuAc=100) to replace a higher boiling point solvent such as NMP (evaporation rate: 0.03 vs. nBuAc=100) is anticipated to improve the property development during curing (e.g. early water resistance, hardness development, etc) due to faster volatilization of the solvent from the coating. However, the solvent choice is not anticipated to impact ultimate performance attributes, such as adhesion and dirt pick-up resistance, of cured coatings. The improvement in performance characteristics with the use of the more benign solvent is unexpected and forms the basis for the invention.

The present invention may be embodied in other forms without departing from the spirit and the essential attributes thereof, and, accordingly, reference should be made to the appended claims, rather than to the foregoing specification, as indicating the scope of the invention.

We claim:

1. A polyurethane dispersion comprising:
    one or more polyurethane units derived from one or more prepolymers, wherein said one or more prepolymers comprise the reaction product of soybean oil based polyols having a hydroxyl number below about 100 mg KOH/g, a substance selected from the group consisting of dimethylol propionic acid, dimethylol botanic acid and diaminosulfonate, and one or more isocyanates in an organic solvent; and
    water
    wherein the soybean oil based polyols are prepared from soybean oil in a process comprising epoxidation, hydroxylation, ozonolysis, esterification, hydroformylation and/or alkoxylation, and wherein the organic solvent is selected from the group consisting of dipropylene glycol dimethyl ether, tripropylene glycol dimethyl ether, acetone, methyl ethyl ketone, toluene, tetrahydrofuran (THF), propylene glycol methyl ether acetate, dipropylene glycol methyl ether acetate, propylene glycol diacetate, diethylene glycol n-butyl ether acetate, and ethylene glycol n-butyl ether acetate.

2. A coated article comprising:
    a substrate;
    a coating associated with one or more surfaces of said substrate, wherein said coating is derived from the polyurethane dispersion according to claim 1.

* * * * *

UNITED STATES PATENT AND TRADEMARK OFFICE
CERTIFICATE OF CORRECTION

PATENT NO. : 8,927,646 B2  
APPLICATION NO. : 13/262574  
DATED : January 6, 2015  
INVENTOR(S) : Bedri Erdem et al.

Page 1 of 1

It is certified that error appears in the above-identified patent and that said Letters Patent is hereby corrected as shown below:

In the Claims

In Claim 1; Col. 16; line 35; correct the spelling of the word "botanic" to "butyric".

Signed and Sealed this
Fourteenth Day of April, 2015

Michelle K. Lee
*Director of the United States Patent and Trademark Office*